United States Patent [19]

Hirano et al.

[11] Patent Number: 4,724,865

[45] Date of Patent: Feb. 16, 1988

[54] CONTROL CIRCUIT FOR PROPORTIONAL ELECTRO-HYDRAULIC FLUID CONTROL VALVES

[75] Inventors: Kenichi Hirano; Yasuyuki Shingu; Eiji Mitsugi, all of Kanagawa, Japan

[73] Assignee: Yuken Kogyo Kabushiki Kaisha, Fujisawa, Japan

[21] Appl. No.: 27,529

[22] Filed: Mar. 18, 1987

[30] Foreign Application Priority Data

Mar. 19, 1986 [JP] Japan .................................. 61-59244

[51] Int. Cl.⁴ ............................................ G05D 16/00
[52] U.S. Cl. .................................... 137/486; 137/487.5
[58] Field of Search ....................... 137/487.5, 486, 900

[56] References Cited

U.S. PATENT DOCUMENTS

| | | | |
|---|---|---|---|
| 2,747,595 | 5/1956 | Dickey | 137/900 UX |
| 3,056,417 | 10/1962 | Greaves | 137/900 UX |
| 3,077,552 | 2/1963 | Koppel | 137/487.5 X |
| 3,552,428 | 1/1971 | Pemberton | 137/487.5 X |
| 3,757,808 | 9/1973 | Peterson | 137/487.5 X |
| 4,285,639 | 8/1981 | Woodring et al. | 417/218 |
| 4,630,631 | 12/1986 | Barnes | 137/487.5 X |

Primary Examiner—Alan Cohan
Attorney, Agent, or Firm—Fleit, Jacobson, Cohn & Price

[57] ABSTRACT

A control circuit for a proportional electro-hydraulic fluid control valve in which during a transient condition with a feedback control signal varying rapidly the control loop is changed to an open loop to change the transient characteristic of the valve to prevent the occurrence of an abnormal surge. The control circuit includes a control loop changeover circuit designed so that when the error signal is greater than a predetermined level, the control mode of the magnitude control of a control output signal is changed from a closed loop control in accordance with the feedback signal to an open loop control in accordance with an input signal.

1 Claim, 14 Drawing Figures

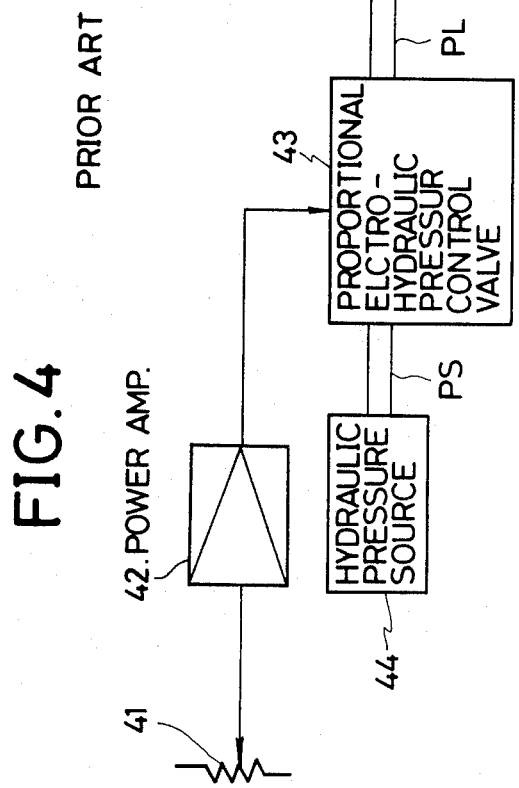

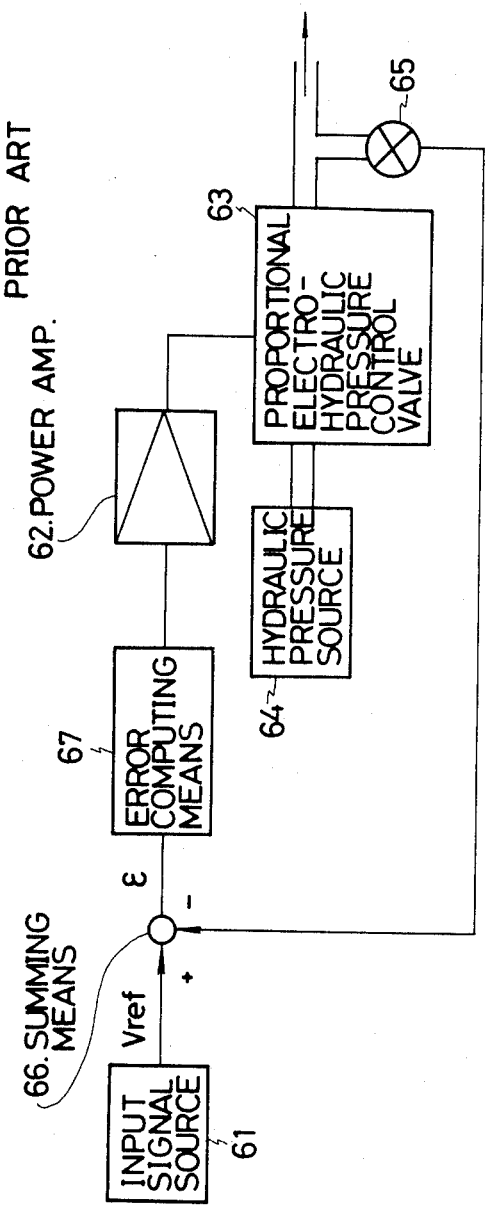

FIG. 7a  Vref
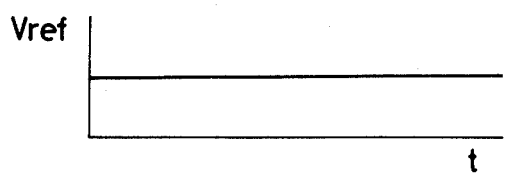
FIG. 7b  i
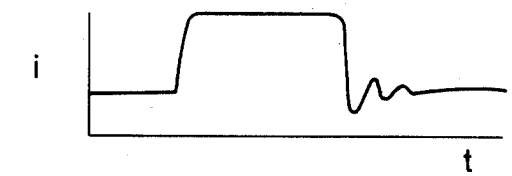
FIG. 7c  PS
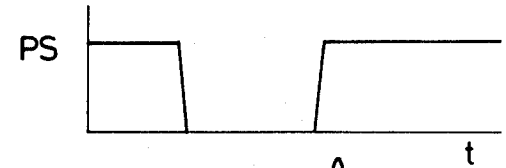
FIG. 7d  PL
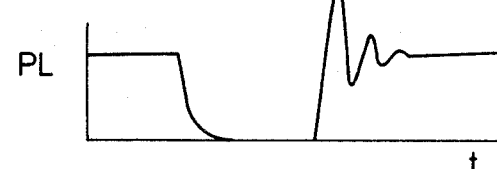
FIG. 7e  ε
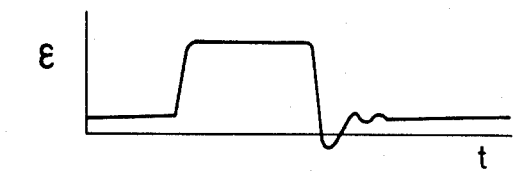

CONTROL CIRCUIT FOR PROPORTIONAL ELECTRO-HYDRAULIC FLUID CONTROL VALVES

BACKGROUND OF THE INVENTION

The present invention relates to a control circuit for proportional electro-hydraulic fluid control valves.

In the past, proportional electro-hydraulic fluid control valves have been generally so designed that the flow rate or pressure of a fluid is controlled in the form of a so-called open loop control by the self-adjusting function incorporated in the valve in accordance with a present input signal to its electric control system. In this case, there is the disadvantage of the flow rate or pressure being changed by variations in the external conditions such as the temperature of the fluid. Thus, attempts have been made to eliminate this disadvantage as shown in U.S. Pat. No. 4,285,639, for example, by detecting the flow rate or pressure as an electric signal by a sensor and feeding back to the electric control system, thereby performing a closed loop control to improve the static accuracy against variations in the external conditions.

Where this closed loop control is used, however, there is the danger of deteriorating the performance than in the case of the open loop control depending on the actual use conditions of the electric system and the hydraulic fluid system of the valve.

SUMMARY OF THE INVENTION

It is the primary object of the present invention to provide a control circuit for a proportional electro-hydraulic fluid control valve which is so designed that the foregoing deficiencies of the conventional closed loop control type are overcome and the occurrence of any surge pressure upon temporary interruption of the supply pressure, stopping of the function of a sensor or in other use conditions is prevented, thereby always performing the control stably.

To accomplish the above object, in accordance with the invention there is thus provided a control circuit which functions to detect as an electric signal the pressure or flow rate of a hydraulic fluid controlled in accordance with an electric control signal by a proportional electro-hydraulic fluid control valve so that the detection signal is fed back to the electric control system of the control valve to subject the magnitude of the electric control signal to a closed loop control in accordance with an error signal representing the difference between a preset input signal to the electric control system and the detection signal, and which includes a control loop changeover circuit which changes the control mode of the magnitude control of the electric control signal from the closed loop control according to the error signal to an open loop control according to the input signal when the error signal exceeds a predetermined level.

In accordance with the proportional electro-hydraulic fluid control valve control circuit of this invention, a decrease in the level of the feedback signal is detected as an increase in the error signal by the changeover circuit so that the control is changed from the closed loop control to the open loop control when the magnitude of the error signal is greater than a certain level and the closed loop control is restored when the error signal returns to the low level. Thus, during a transient condition the open loop control provides a control with an excellent transient characteristic without causing any abnormal surge and during a steady-state condition the closed loop control provides a highly accurate control, thereby improving the control quality.

The above and other objects as well as advantageous features of the invention will become more clear from the following description taken in conjunction with the drawings.

BRIEF DESCRIPTION OF THE DRAWINGS

FIG. 4 is a block diagram showing a typical example of the conventional open loop control.

FIG. 6 is a block diagram showing a typical example of the conventional closed loop control.

FIGS. 7a to 7e are graphs useful for explaining the operation in a faulty condition according to the conventional closed loop control, showing the variation with time of a preset input signal, control signal, supply pressure, controlled pressure and error signal, respectively.

DESCRIPTION OF THE PREFERRED EMBODIMENTS

Before the description of preferred embodiments of the invention, some examples of the ordinary control circuit of these types will be described with reference to the drawings for the purpose of facilitating the understanding of the invention.

Figure 5A:
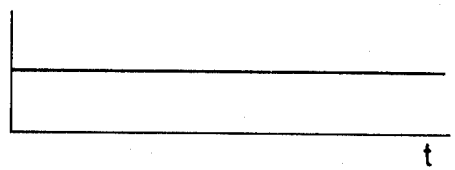
FIGS. 5a to 5d are graphs useful for explaining the operation in a faulty condition according to the conventional open loop control, showing the variation with time of a preset input signal, control signal, supply pressure and controlled pressure, respectively.
Figure 5B:
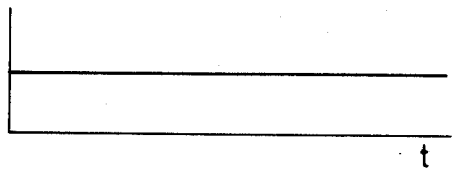
Figure 5C:
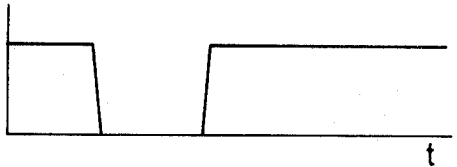
Figure 5D:
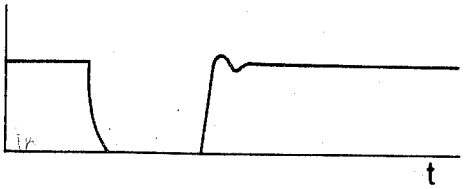

Referring to FIG. 4, there is illustrated an example of a typical system construction of a proportional electro-hydraulic fluid control valve of the open loop control type which provides a pressure control by way of example. In the Figure, a preset input signal V from an input signal source 41 is applied to a power amplifier 42 whose output current i is applied as an electric control signal to the solenoid means (not shown), for example, of a proportional electro-hydraulic fluid (pressure) control valve 43 and a pressure PS of a hydraulic fluid from a hydraulic fluid source 44 is controlled at a controlled pressure PL in proportion to the output current i. In this type of open loop control, with the preset input signal V being constant as shown in FIG. 5a and hence the control signal i being constant as shown in FIG. 5b, if the supply pressure PS is interrupted temporarily for some reason or other as shown in FIG. 5c, the controlled pressure PS shows a behavior as shown in FIG. 5d so that when the supply pressure PS is restored to the initial level, the controlled pressure PL immediately follows up or responds with a slight overshoot in its waveform.

Then, an examination of this condition under closed loop control will result as follows.

FIG. 6 shows an example of a typical system construction of a proportional electro-hydraulic fluid control valve of the closed loop control type which also provides a pressure control, for example. In the Figure, an output current i from a power amplifier 62 is applied as an electric signal to the solenoid means (not shown), for example, of a preportional electrohydraulic fluid control valve 63 which in turn controls a hydraulic fluid pressure PS from a hydrauric pressure source 64 at a controlled pressure PL in proportion to the output current i, so that the controlled pressure PL is detected as an electric signal by a pressure sensor 65 and an error signal $\epsilon$ representing the difference between this electric signal and a preset input signal Vref from an input signal source 61 is generated by summing means 66 to apply it as an input signal to the power amplifier 62 through error computing means 67, thereby performing the closed loop control involving the feedback of pressure. Consider the effect of the same interruption of the hydraulic fluid supply as mentioned previously on this closed loop control. FIG. 7a shows the preset input signal Vref and the controlled pressure PL is maintained at a pressure value corresponding to the preset input signal Vref as long as the hydraulic fluid spply from the hydraulic pressure source 64 is normal. Then, if the supply pressure PS is interrupted temporarily and applied again as shown in FIG. 7c, the controlled pressure PL produces a surge pressure with a large overshoot as shown in FIG. 7d. The reason is as follows. In the closed loop control, the interruption of the supply pressure PS results electrically in the detection of a large error signal $\epsilon$ as shown in FIG. 7e so that the current i is increased in a direction which increases the controlled pressure PL and eventually the output current i of the power amplifier 62 is increased up to the saturation level. When the supply pressure PS is restored in this condition, the controlled pressure PL is increased unnecessarily and this is maintained as vibrations over a period of time determined by the response characteristic of the loop. This phenomenon takes place as the similar behavior when, for example, the sensor 65 stops to function due to the interruption of its power supply or the like. Also, an abnormal surge pressure is caused for example in a pressure feedback control of a relief valve by the similar reason when the load flow is large and the flow is suddenly escaped in a condition tending to decrease below the setting pressure.

Figure 1:
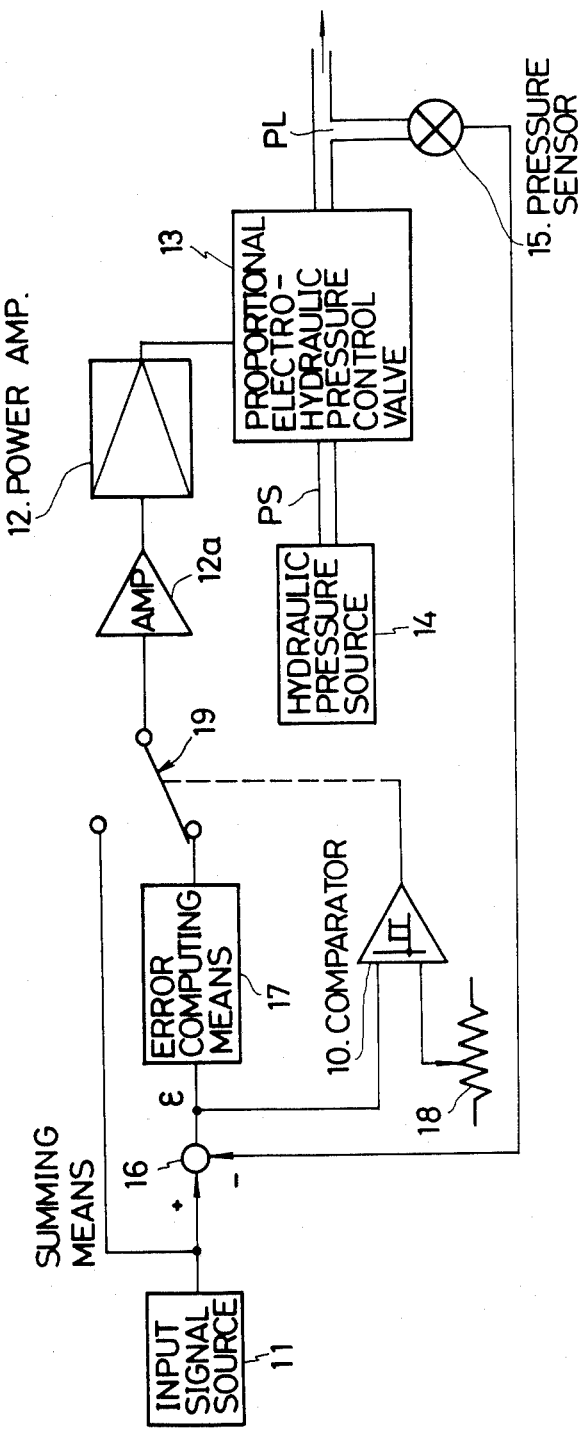
FIG. 1 is a block diagram showing the construction of a first embodiment of the present invention.

Referring now to FIG. 1 illustrating a block diagram showing the construction of a first embodiment of the invention, a proportional electro-hydraulic fluid control valve 13 controls the pressure of a hydraulic fluid from a hydraulic pressure source 14 in proportion to the output current of a power amplifier 12. The controlled pressure PL is detected as an electric signal by a pressure sensor 15 and the electric signal is sent as a feedback signal to summing means 16. The summing means 16 obtains the difference or error $\epsilon$ between the preset input signal from an input signal source 11 and the feedback signal applied it to error computing means 17. The error computing means 17 generates a control signal i corresponding to the applied error signal $\epsilon$. The error signal $\epsilon$ is also applied to a comparator 10 which in turn compares the error signal $\epsilon$ with the reference level preliminarily established by a setting adjuster 18. When the error signal 68 is greater than the reference level, the comparator 10 applies a switching signal to a switch 19. When there is no switching signal, the comparator 10 applies the control signal i generated from the error signal computing means 17 to the power amplifier 12 through an amplifier 12a to select the closed loop control. While as long as there is the switching signal, the preset input signal from the input signal source 11 is applied in place of the control signal i to the power amplifier 12 through the amplifier 12a.

In this embodiment, as long as the supply pressure PS from the hydraulic pressure source 14 is normal and in the steady-state condition, the switch 19 applies the control signal i to the power amplifier 12 through the amplifier 12a thereby operating the valve in the closed loop control mode. If, for example, the hydraulic fluid supply from the hydraulic pressure source 14 is interrupted temporarily during the interval, the output of the pressure sensor 15 or the feedback signal is decreased in level and thus the level of the error signal $\epsilon$ is increased. When the level of the error signal exceeds the reference level of the setting adjuster 18, the output of the comparator 10 changes the position of the switch 19 and the control system is placed in the open loop control mode. In other words, the feedback loop is disconnected by the switch 19 and the preset signal from the input signal source 11 is directly applied as a control input to the amplifier 12a. Thus, the application of a large control input corresponding to the high-level error signal $\epsilon$ to the power amplifier 12 is prevented and the open loop is selected thereby changing the transient characteristic of the control system to a high response characteristic which is not limited by the feedback loop. As a result, even if the supply pressure PS is thereafter restored rapidly, the open loop control is not cut out until the value of the pressure detected by the pressure sensor 15 is restored sufficiently to make the level of the error signal 68 smaller than the reference level and the switch 19 is moved back to the position which selects the closed loop control only when the error signal $\epsilon$ is decreased below the reference level by the increase in the level of the feedback signal. In this way, any abnormal high-level input to the power amplifier 12 is always limited to a value lower than the value preset by the setting adjuster 18 and the occurrence of any abnormal surge upon the restoration of the pressure is also suppressed.

Figure 2:
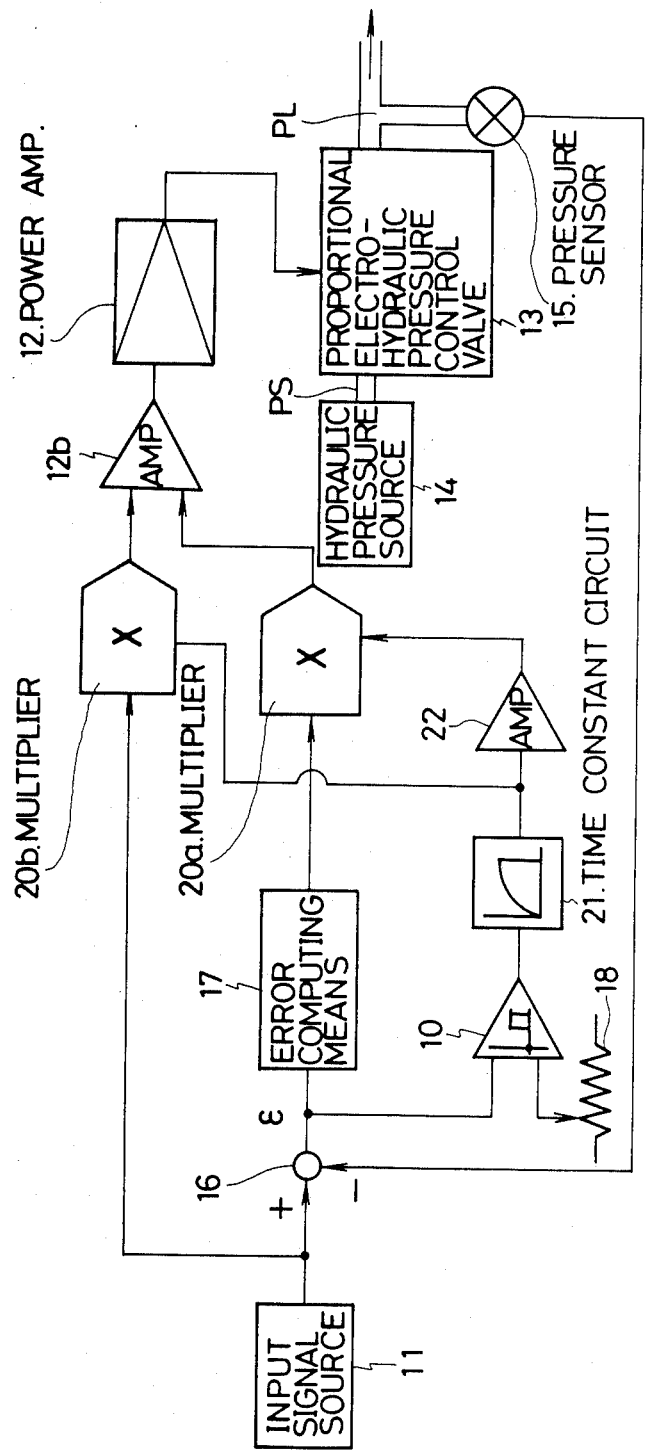
FIG. 2 is a block diagram showing the construction of a second embodiment of the invention.

FIG. 2 is a block diagram showing the construction of a second embodiment of the invention and the same reference numerals as used in FIG. 1 designate the same or equivalent components. In this embodiment, the step-like output signal of the comparator 10 is varied in level at the desired rate through a time constant circuit 21 comprising an integrator or the like so that on the one hand the signal is inverted through an amplifier 22 and applied to a multiplier 20a, while on the other hand the signal is applied directly to another multiplier 20b. The multiplier 20a multiplies the applied signal by the closed loop control signal i from the error computing means 17 and the other multiplier 20b multiplies the applied signal by the open loop preset input signal from the input signal source 11. The two multiplier outputs which have been varied in the opposite directions with respect to each other are applied to the power amplifier 12 through the amplifier 12b. Thus, the so-called fade-in and fade-out controls are combined in such a manner that when the error signal $\epsilon$ exceeds the reference level or conversely to the level lower than the reference level, the changeover from the closed loop control to the open loop control or the reverse changeover is effected gradually without any shock. In this way, the occurrence of any electric and fluidic shocks during the opening and closing of the loop is prevented and the control is performed stably without causing any vibrations or the like.

Figure 3:
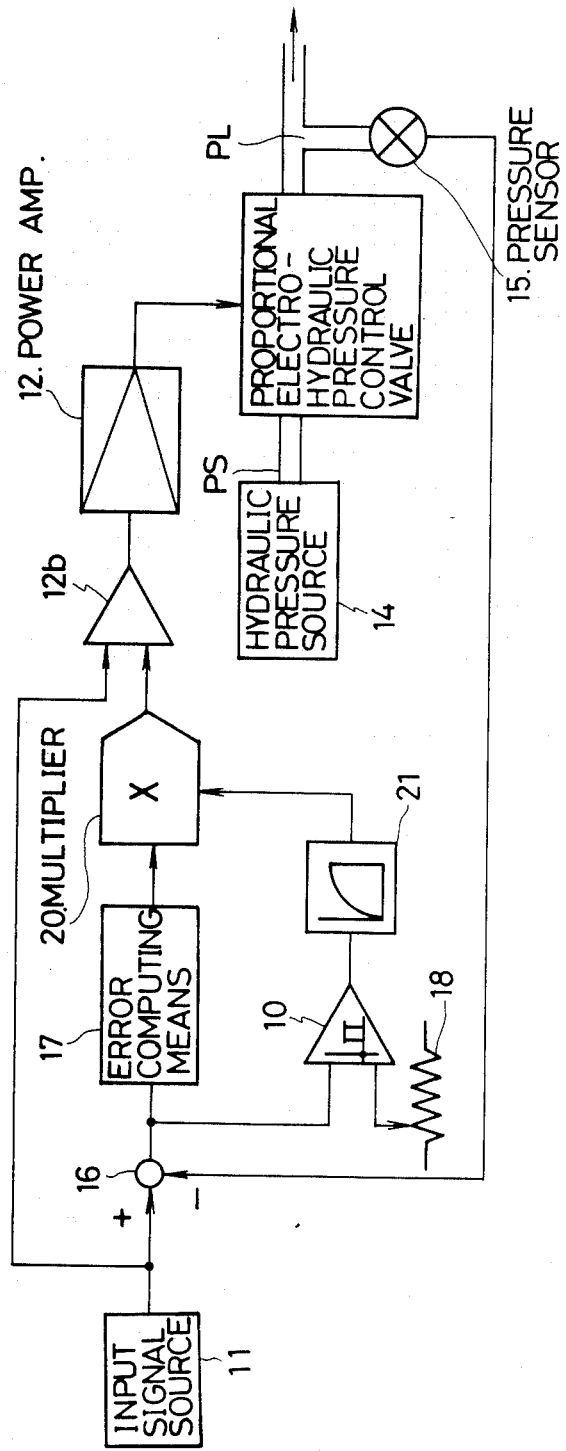
FIG. 3 is a block diagram showing the construction of a third embodiment of the invention.

FIG. 3 is a block diagram showing the construction of a third embodiment of the invention and the same reference numerals as used in FIGS. 1 and 2 designate the same or equivalent components. In this embodiment, as will be seen from a comparison with the second embodiment, only the switching of the closed loop control signal from the error computing means 17 is effected gradually through a multiplier 20 and the open loop control input from the input signal source 11 is always applied to the amplifier 12b. In this case, there is the advantage of simplifying the construction by decreasing the number of multipliers by one through only some change of the computational content of the error computing means 17.

While these embodiments have been described as applied to the control of pressure by way of example, it is evident that the invention is equally applicable to the feedback control by a flow detection value in the flow control.

From the foregoing description it will be seen that in accordance with the invention, by virtue of the control loop changeover circuit which is designed so that changeover from the closed loop control to the open loop control is effected temporarily in response to a decrease in the level of the feedback signal or its loss and the changeover from the open loop control to the closed loop control is effected when the feedback signal is restored satisfactorily, there is the effect that at the time of removal of a faulty condition in the feedback system or the hydraulic fluid system the occurrence of a surge pressure is suppressed and the response with an excellent transient characteristic is ensured, thereby improving the quality of the control without sacrificing the advantage of the high accuracy of the closed loop control.

We claim:

1. In a control circuit for a proportional electro-hydraulic fluid control valve wherein a pressure or flow rate of a hydraulic fluid which is proportionally controlled by the proportional electro-hydraulic fluid control valve in accordance with an electric control signal, is detected as an electric signal and the detection signal is fed back to an electric control system of the control valve to subject the magnitude of the electric control signal to a closed loop control in accordance with an error signal between a preset input signal to the electric control system and the detection signal, the improvement comprising:

control loop changeover means which changes the control mode of the magnitude control of said electric control signal from
(a) said closed loop control in accordance with said error signal; to
(b) an open loop control in accordance with said preset input signal when said error signal is greater than a predetermined level.

* * * * *